(12) United States Patent
Shintani

(10) Patent No.: US 9,225,931 B2
(45) Date of Patent: Dec. 29, 2015

(54) MOVING IMAGE DATA RECORDING APPARATUS

(75) Inventor: Takuya Shintani, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 13/353,210

(22) Filed: Jan. 18, 2012

(65) Prior Publication Data

US 2012/0189283 A1  Jul. 26, 2012

(30) Foreign Application Priority Data

Jan. 21, 2011  (JP) ................. 2011-011205

(51) Int. Cl.
*H04N 9/80* (2006.01)
*H04N 5/77* (2006.01)
*H04N 5/783* (2006.01)
*H04N 5/91* (2006.01)

(52) U.S. Cl.
CPC ................ *H04N 5/772* (2013.01); *H04N 5/783* (2013.01); *H04N 5/91* (2013.01)

(58) Field of Classification Search
CPC  H04N 7/0357; H04N 7/3077; H04N 21/2404
USPC ................................. 386/263–290
See application file for complete search history.

(56) References Cited

U.S. PATENT DOCUMENTS

| | | | |
|---|---|---|---|
| 6,504,993 B1* | 1/2003 | Matsumoto ................... | 386/240 |
| 2006/0082652 A1* | 4/2006 | Sugiyama .................. | 348/207.1 |
| 2008/0022350 A1* | 1/2008 | Hostyn et al. ................. | 725/139 |
| 2008/0037658 A1* | 2/2008 | Price et al. ............... | 375/240.26 |
| 2010/0266263 A1* | 10/2010 | Murakami .................... | 386/113 |

FOREIGN PATENT DOCUMENTS

| | | | |
|---|---|---|---|
| JP | 2002-218384 A | 8/2002 |
| JP | 2006-186411 A | 7/2006 |
| JP | 2008-047169 A | 2/2008 |
| JP | 2010-268247 A | 11/2010 |

* cited by examiner

*Primary Examiner* — Hung Dang
(74) *Attorney, Agent, or Firm* — Canon U.S.A., Inc. IP Division

(57) ABSTRACT

A controller included in a moving image data recording apparatus controls an editor and a recorder so as to generate a moving image file composed of a plurality of moving image data each having a predetermined length of time, and in a case where an error occurs when newly acquired moving image data is being added to the moving image file, the controller controls the editor and the recorder so as not to add moving image data to be next acquired to a moving image file containing moving image data acquired during occurrence of the error.

5 Claims, 11 Drawing Sheets

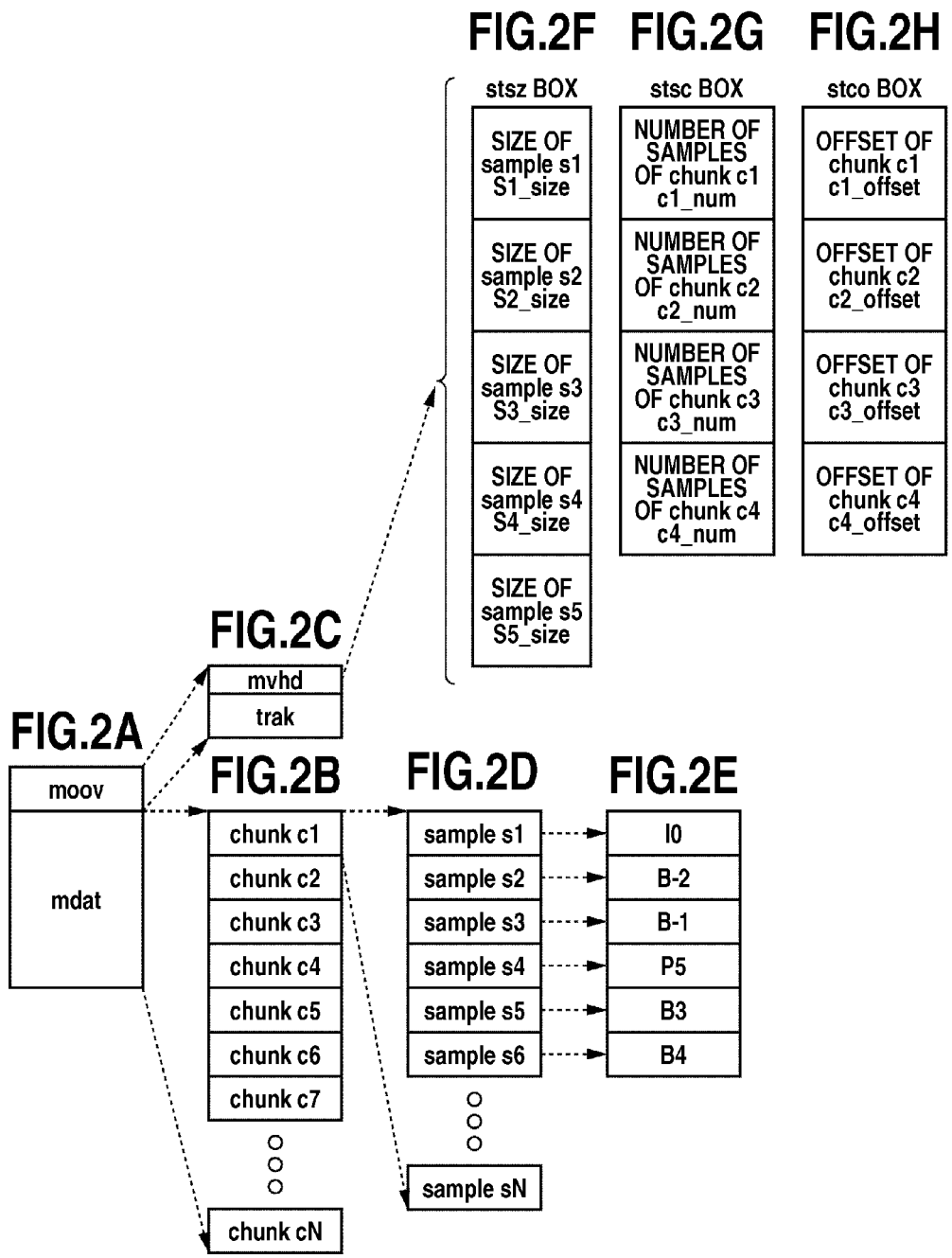

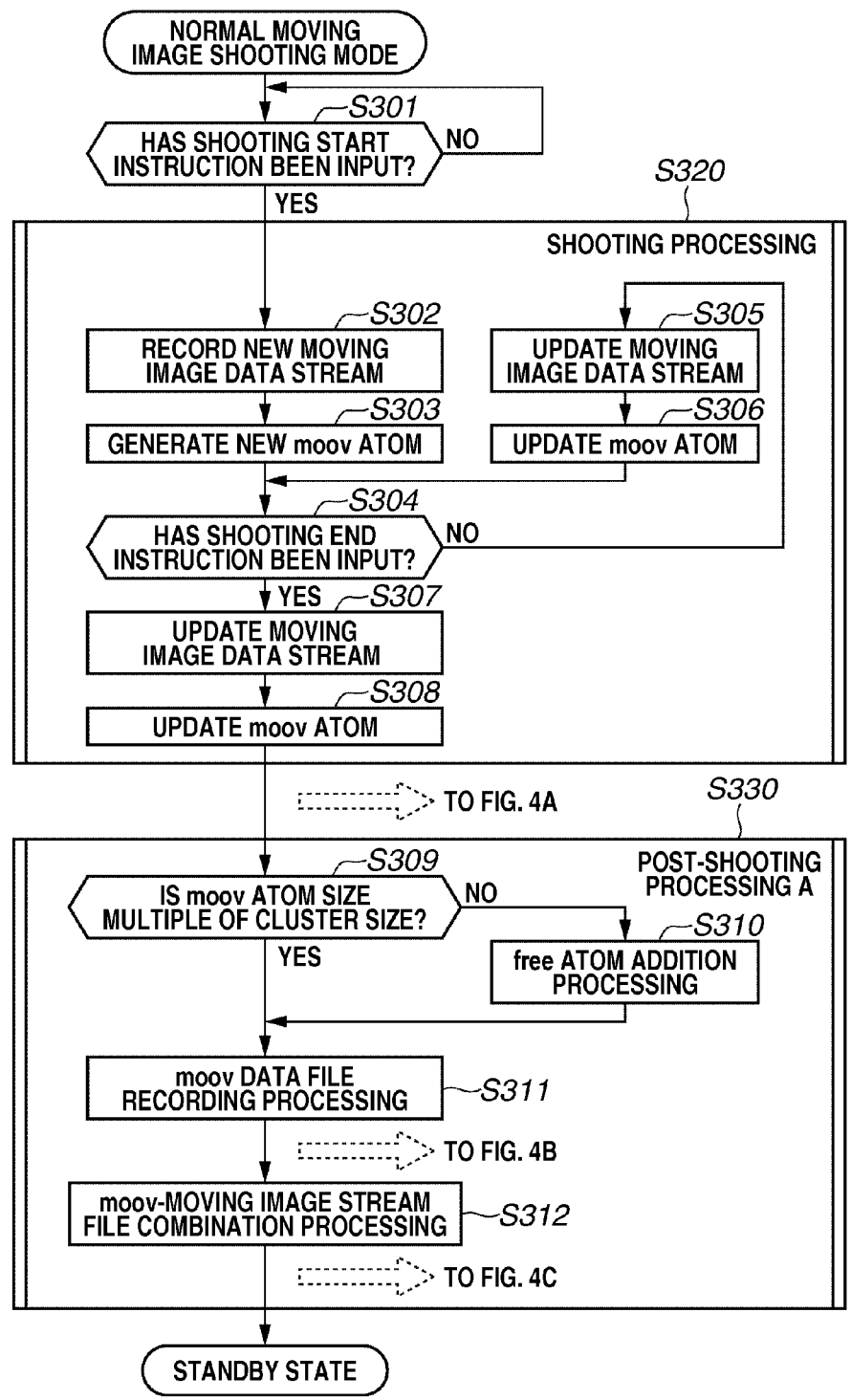

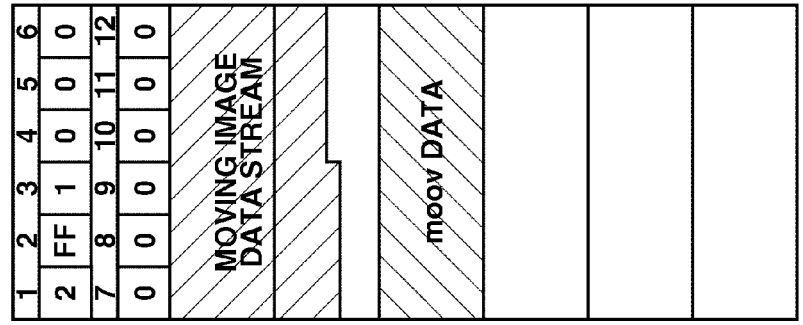
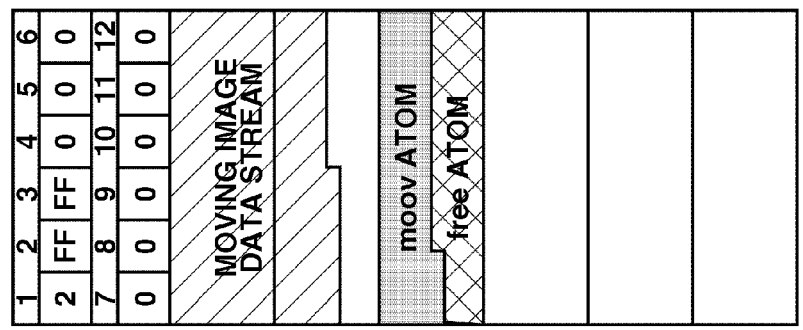
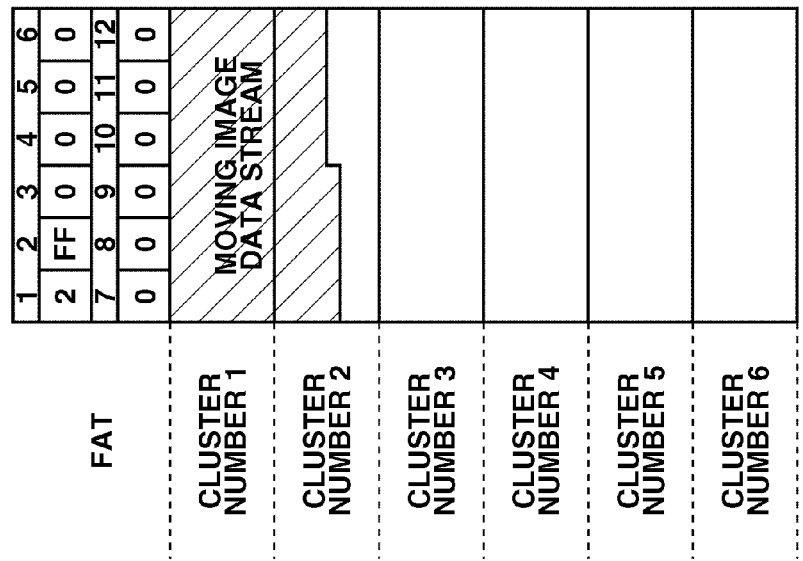

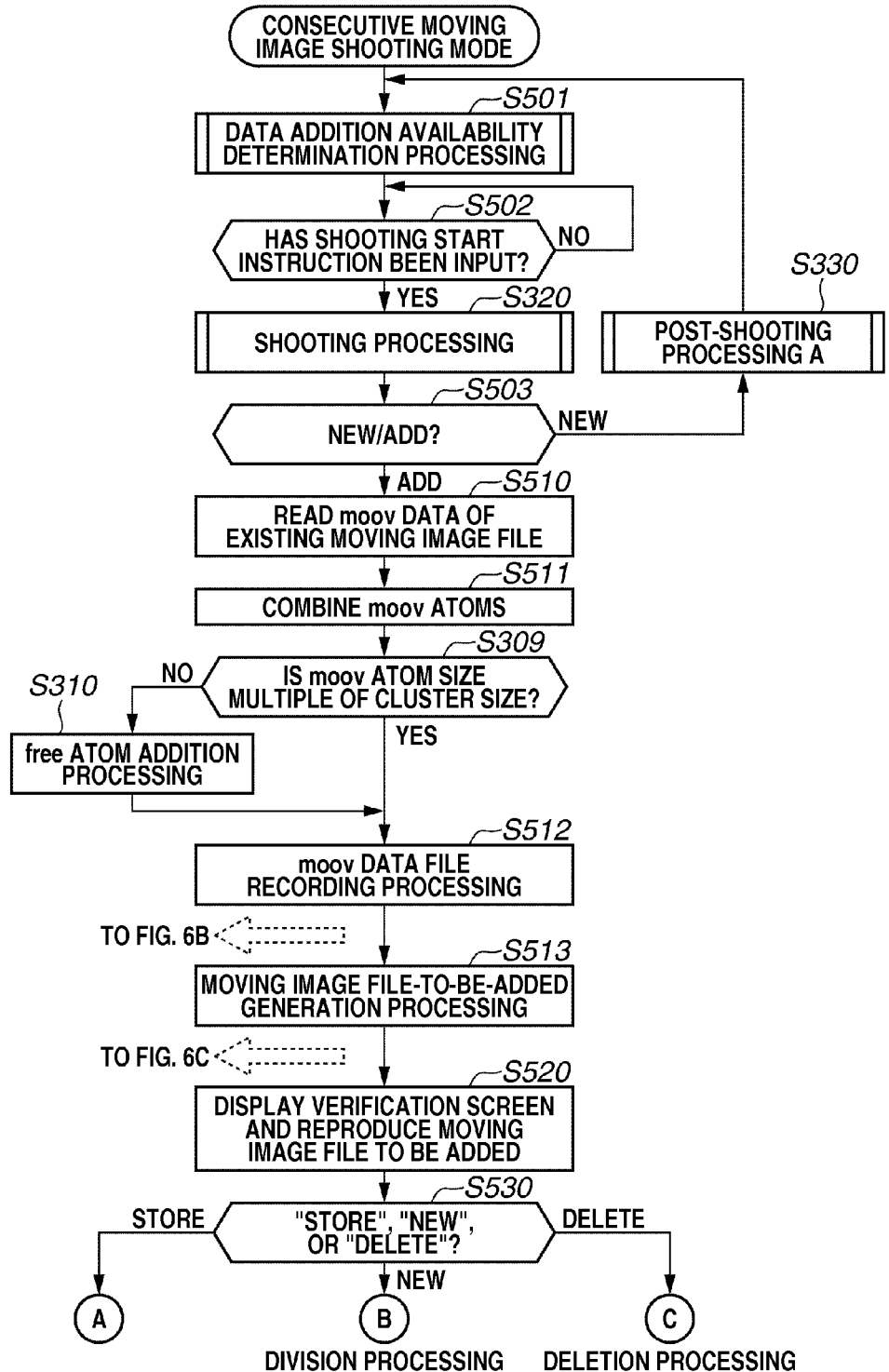

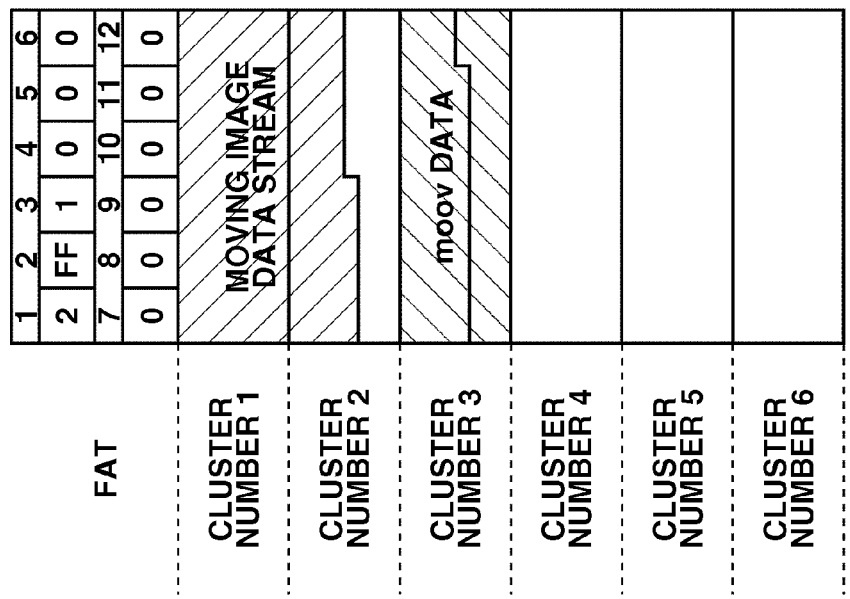
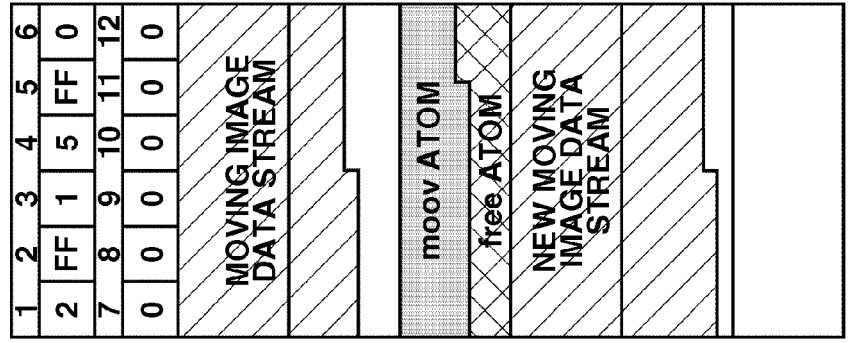
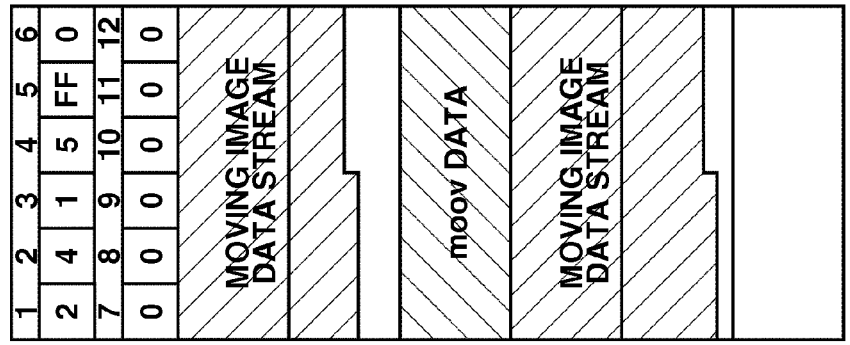

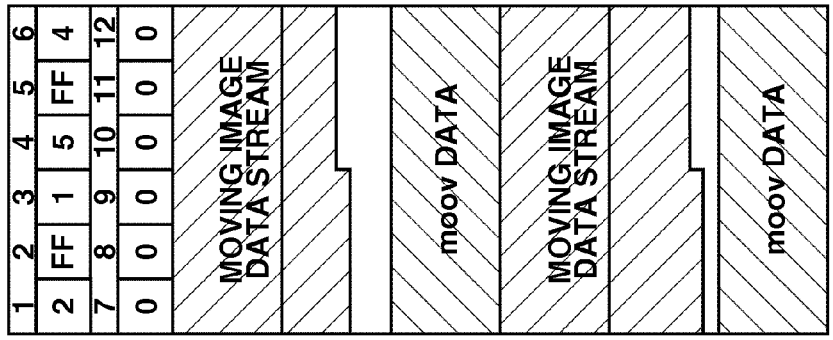
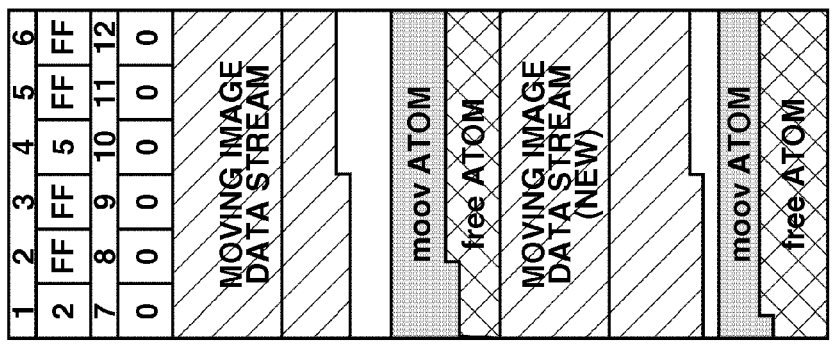
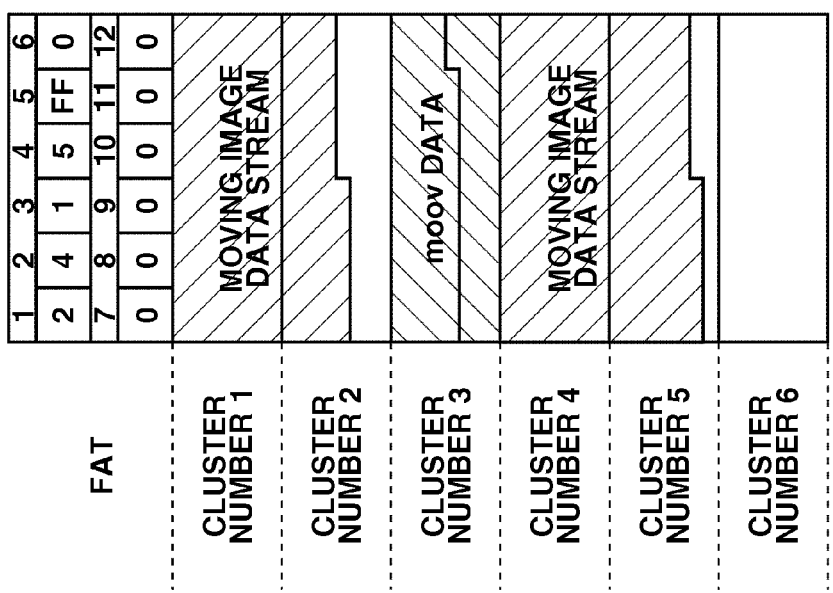

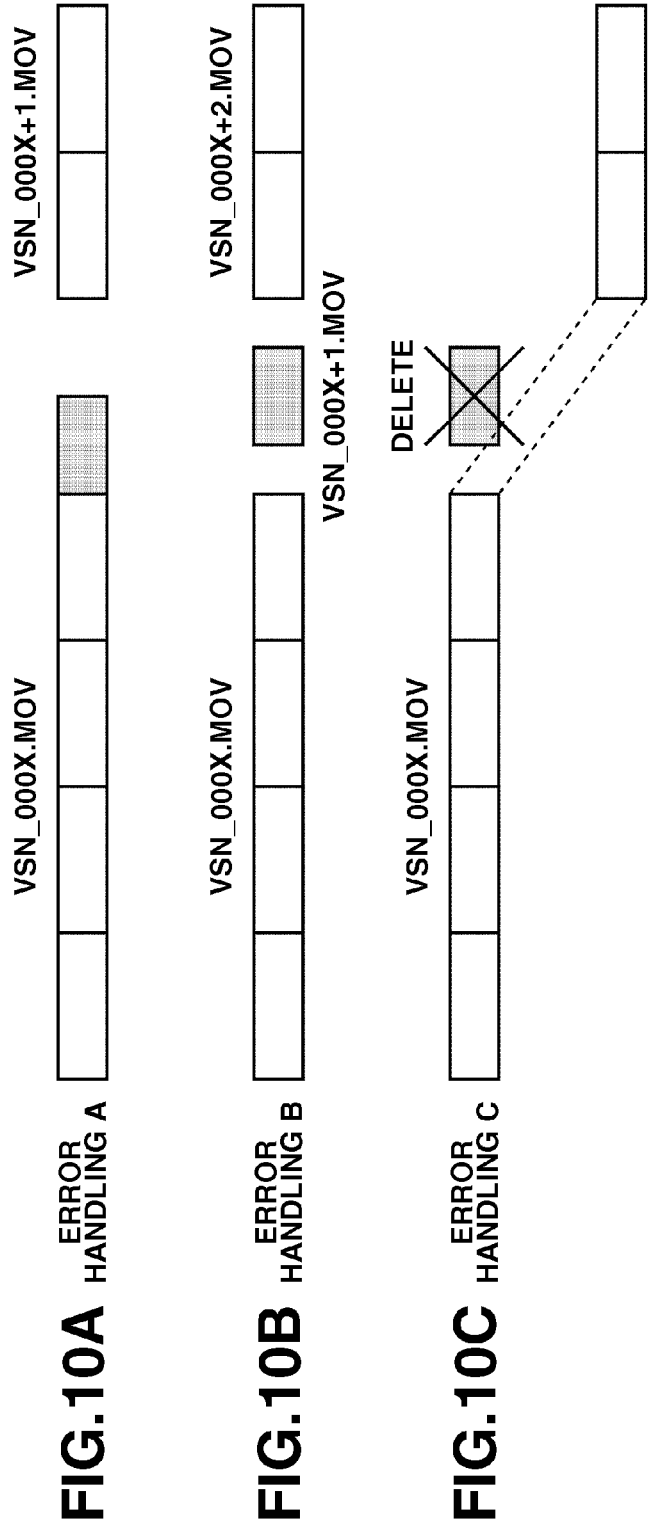

MOVING IMAGE DATA RECORDING APPARATUS

BACKGROUND OF THE INVENTION

1. Field of the Invention

The present invention relates to a moving image data recording apparatus.

2. Description of the Related Art

Conventionally, an imaging apparatus has been known as a moving image data recording apparatus, and the imaging apparatus has functions for generating moving image data from a captured image, and for recording the resulting data on a recording medium. In the imaging apparatus of this type, in recent years, there has been proposed a new imaging apparatus capable of adding and recording newly captured moving image data into moving image data stored in an existing moving image file that has been recorded on a recording medium, as described in Japanese Patent Application Laid-Open No. 2002-218384. Moreover, a function for capturing moving images for a period of predetermined seconds each time a shooting button is pressed has also been installed in an imaging device.

In Japanese Patent Application Laid-Open No. 2002-218384, however, newly captured moving image data is directly connected to moving image data of the existing moving image file. In this case, however, when, upon shooting a connecting image, for example, the battery is removed, or when the memory card is removed, an error may occur. In such a case, a read-out unable state of the data tends to occur together with the moving image data of the existing moving image data, which is to be connected thereto. Moreover, moving image data that is being recorded tends to be automatically connected. For example, in a case where a user is trying to generate a moving image file composed of a plurality of collected moving image data each having a predetermined length of time, moving image data other than the predetermined length of time tends to be mingled therein by the error. In such a case, for example, in a case where, during reproduction, settings are made so as to fast forward or rewind (skip forward, or skip backward) moving images of a moving image file for a unit of a predetermined length of time, desired operations are not carried out, and inconvenient operations might be caused.

SUMMARY OF THE INVENTION

The present invention is directed to a moving image data recording apparatus in which, even in a case where, upon generating a moving image file composed of a plurality of moving image data, each having a predetermined length of time, an error occurs, a recording state of new moving image data, or a recording state of moving image data to be next captured can be automatically changed so as not to cause inconvenience in operations to the user during reproduction.

According to an aspect of the present invention, a moving image data recording apparatus includes an acquisition unit that acquires moving image data, a recorder that records the moving image data acquired by the acquisition unit on a recording medium as a moving image file, an editor that edits a moving image file recorded on the recording medium so as to add the moving image data acquired by the acquisition unit to the moving image file recorded on the recording medium, and a controller that controls the recorder and the editor, wherein the controller controls the editor and the recorder so as to generate a moving image file composed of a plurality of moving image data each having a predetermined length of time, and wherein, in a case where an error occurs when newly acquired moving image data is being added to the moving image file, the controller controls the editor so as not to add moving image data to be next acquired to a moving image file containing moving image data acquired during occurrence of the error.

According to an exemplary embodiment of the present invention, even in a case where, upon generating a moving image file composed of a plurality of moving image data, each having a predetermined length of time, an error occurs during a recording operation of new moving image data, a recording state of new moving image data, or a recording state of moving images to be next captured, can be automatically changed. Therefore, inconvenient operations of users can be reduced during reproduction.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A, 2B, 2C, 2D, 2E, 2F, 2G, and 2H are diagrams that illustrate a structure of a moving image file.

FIG. 3 is a flow chart that illustrates control operations of the imaging apparatus in a normal moving image shooting mode.

FIGS. 4A, 4B, and 4C are diagrams that illustrate a data area and a file allocation table (FAT) area of a moving image file recording on a recording medium.

FIGS. 5A and 5B are flow charts that illustrate control operations of the imaging apparatus in a consecutive moving image shooting mode.

FIGS. 6A, 6B, and 6C are diagrams that illustrate an adding operation of a moving image file to the recording medium.

FIGS. 8A, 8B, and 8C are diagrams that illustrate a separation of a moving image file on the recording medium.

FIGS. 10A, 10B, and 10C are diagrams that illustrate a state of a moving image file after an error handling operation.

DESCRIPTION OF THE EMBODIMENTS

Figure 1:
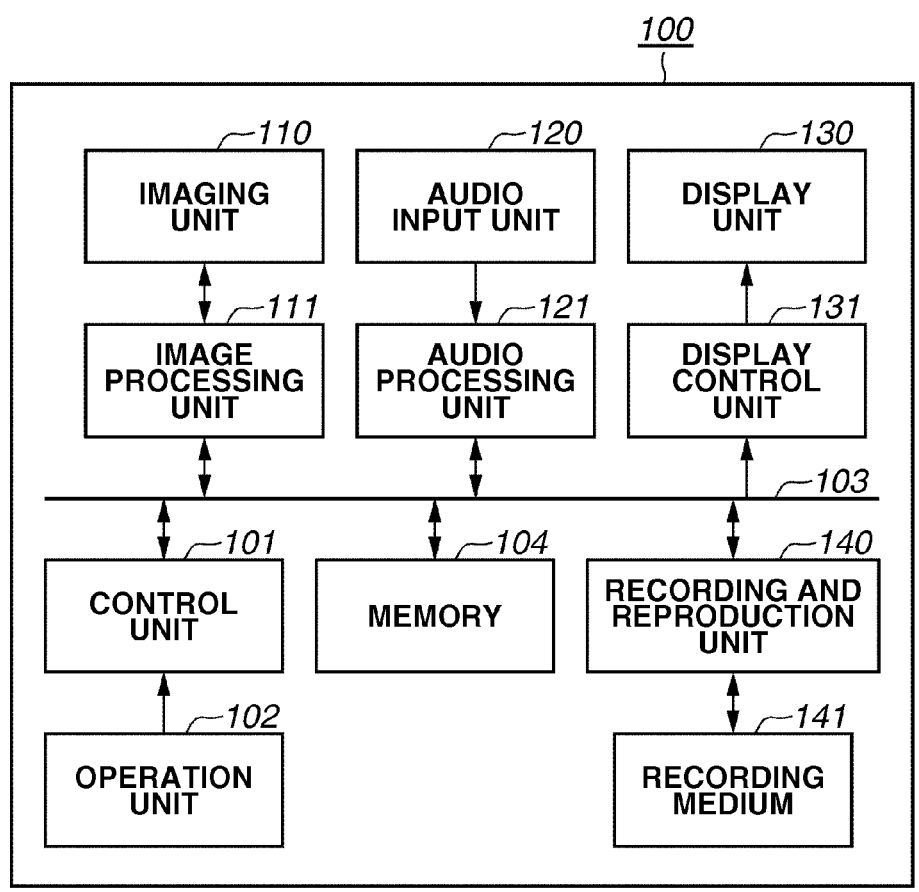
FIG. 1 is a block diagram that illustrates a configuration of an imaging apparatus according to an exemplary embodiment of the present invention.

Various exemplary embodiments, features, and aspects of the invention will be described in detail below with reference to the drawings.

The following description will discuss an imaging apparatus capable of shooting moving images according to an exemplary embodiment of the present invention. In a normal moving image shooting mode (first mode), the image shooting apparatus according to the exemplary embodiment is able to record moving image data captured from the start of a moving image shooting process of one time to its completion on a recording medium as one file. Moreover, in a consecutive moving image shooting mode (second mode), the image shooting apparatus is able to record, on a recording medium, a moving image file (added moving image file) formed by adding newly captured moving image data (new moving image data) to a moving image file (existing moving image file) that has already been recorded on the recording medium. In other words, in the consecutive moving image shooting mode, since data is added to the existing moving image file, a new file is not recorded on a recording medium each time a recording process is performed. In this connection, under a specific condition in the consecutive moving image shooting mode, data may be recorded on a recording medium as a new moving image file (new moving image file), without being added to the existing moving image file.

In particular, upon newly capturing a moving image in the consecutive moving image shooting mode, the imaging apparatus of the present exemplary embodiment displays the moving image after the image shooting on a display screen, and allows the user to confirm the image. Furthermore, the moving image data (existing moving image data) of the existing moving image file and new moving image data may be reproduced in a seamless manner and displayed. Then, after the user has confirmed consecutively reproduced moving images, by using a displayed selection screen (operation screen, referred to also as "user interface"), the user can select processes, such as recording an adding moving image file,
recording new moving image data as another file, and
deleting new moving image data,
and execute the resulting process. Moreover, a physical switch may be prepared so as to allow the user to make a selection of these processes.

In a case where a plurality of moving image files cannot be reproduced in parallel with one another, the added moving image file is preliminarily recorded on the recording medium, and the moving image data of the added moving image file is successively reproduced and displayed. Then, according to the selected process, the state of the moving image file is altered. In other words, in a case where an adding moving image file is recorded, the added image file is left as recorded on the recording medium.

Moreover, in a case where new moving image data is not added but is recorded as another file, the new moving image data is separated from the added moving image file, and header information or the like is applied thereto so as to form a new file, which is then stored on the recording medium as a new moving image file. Then, so as to form the moving image file, made of the existing moving image data left in the added moving image file, into one moving image file, header information to the added moving image file is altered and then recorded on the recording medium. That is, such an editing process as to return to the state of the existing moving image file is carried out.

Moreover, in a case where new moving image data is deleted, newly captured moving image data is separated from the added moving image file, and the moving image data is deleted from the recording medium. Furthermore, so as to form the moving image file, made of the existing moving image data left in the added moving image file, into one moving image file, header information to the added moving image file is altered and then recorded on the recording medium. That is, such an editing process as to return to the state of the existing moving image file is carried out.

In the present exemplary embodiment, a recording medium, formatted in association with a file system that carries out a recording process by using a file allocation table (for example, FAT 32 or the like is used in the present exemplary embodiment as a file system), is used. Then, in a case where the above-mentioned added moving image file is generated, or when the added moving image file is separated, the editing process on the file allocation table (FAT) is carried out. Therefore, the adding process and separating process of moving images can be carried out easily.

According to the imaging apparatus of the present exemplary embodiment, even in the case of an imaging apparatus that does not reproduce moving image data of a plurality of files in a seamless manner, immediately after a new moving image has been captured, the existing moving image data and the new moving image data can be reproduced in a seamless manner and displayed. Then, according to the process selected by the user, added moving image file can be recorded, or new moving image data can be recorded as another file, or new moving image data can be deleted. Therefore, the imaging apparatus of the present exemplary embodiment is able to improve the use convenience for the user, while avoiding high costs.

Figure 5B:
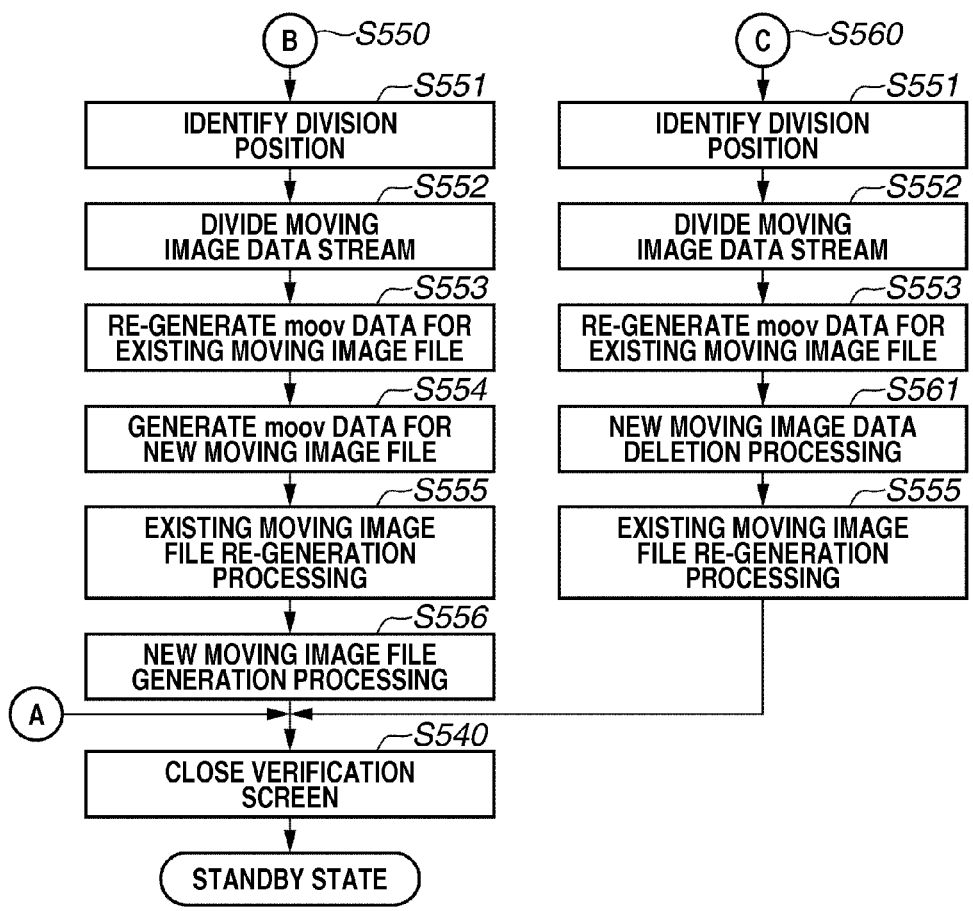
Figure 7B:
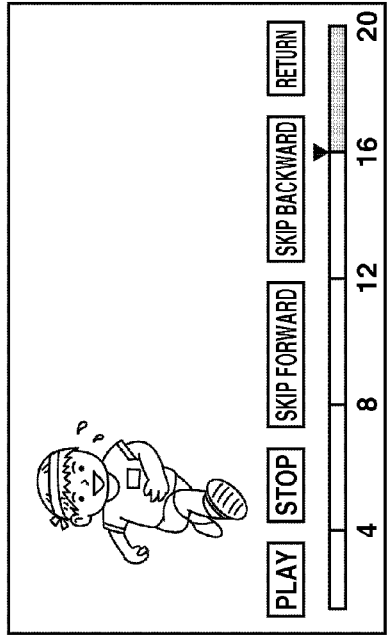
FIGS. 7A, 7B, and 7C are diagrams that illustrate confirmation screens after image shooting in the consecutive moving image shooting mode.
Figure 7A:
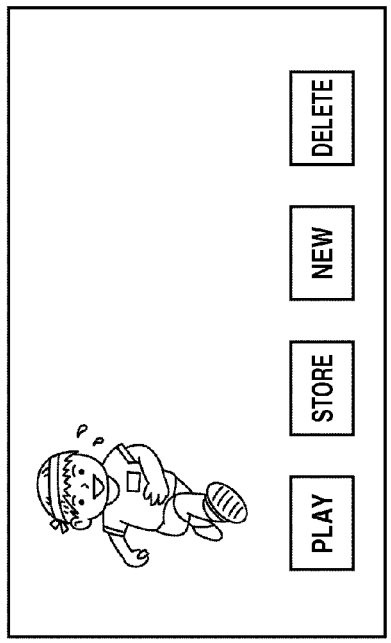
Figure 7C:
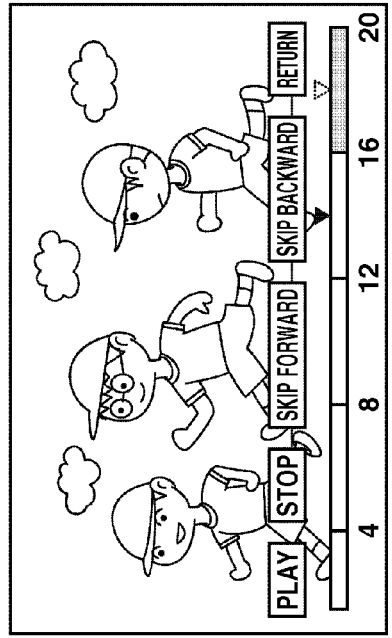

In the present exemplary embodiment, first, referring to FIG. 1, the entire configuration of the imaging apparatus is described. Referring to FIGS. 2A, 2B, 2C, 2D, 2E, 2F, 2G, and 2H, a file format of a moving image file to be recorded on a recording medium is described. Moreover, referring to FIG. 3, control operations of the imaging apparatus in a normal moving image shooting mode are described. Referring to FIGS. 4A, 4B, and 4C, data areas and FAT areas of moving image files recorded on the recording medium are described. Referring to FIGS. 5A and 5B, control operations of the imaging apparatus in a consecutive moving image shooting mode are described. Referring to FIGS. 6A, 6B and 6C, an adding operation of a moving image file on the recording medium in the consecutive moving image shooting mode is described. Referring to FIGS. 7A, 7B, and 7C, confirmation screens after image shooting in the consecutive moving image shooting mode are described. Moreover, referring to FIGS. 8A, 8B, and 8C, separation of a moving image file on the recording medium is described. Furthermore, referring to FIGS. 9A, 9B, and 9C, a partial deleting process of a moving image file on the recording medium is described. Then, referring to FIGS. 10A, 10B, and 10C, at the time when a moving image recording is stopped upon capturing new moving image data in the consecutive moving image shooting mode, a state of an added imaging file and a recording state of a moving image file in the succeeding image shooting are described.

First, referring to FIG. 1, the entire configuration of an imaging apparatus 100 according to the present exemplary embodiment is described.

In FIG. 1, a control unit 101, which is constituted by, for example, a central processing unit (CPU) (micro processing unit (MPU)), a memory (DRAM, SRAM), etc., executes various processes (programs) in response to an operation signal from an operation unit 102, which receives operations from a user, so that respective blocks of the imaging apparatus 100 are controlled, and controls data transferring operations among the respective blocks. The control unit 101 may be a microcomputer composed of a CPU and a memory.

The control unit 102 is provided with various switches, through which various operations relating to image shooting are input, such as, for example, a power-supply button, a recording start button, a zoom-adjusting button, an auto-focusing button, etc. Moreover, it is also provided with a menu display button, a determination button, other cursor keys, a pointing device, a touch panel, etc., and when a user operates one of these keys and buttons, the corresponding operation signal is transmitted to the control unit 101.

A bus 103 is a general bus for use in transmitting various data, control signals, instruction signals, etc., to the respective blocks of the imaging apparatus 100.

An imaging unit 110 controls a quantity of light of an optical image of a subject captured by a lens by using a diaphragm, converts it to an image signal by using an image sensor, such as a charge-coupled device (CCD) sensor and a complementary metal-oxide semiconductor (CMOS) sensor, and further analog/digital converts the image signal so as to transmit the resulting signal to an image processing unit 111.

The image processing unit 111, which executes processes required for recording and reproducing an image, is configured as a microcomputer in which programs that execute the following processes are installed. Moreover, the image processing unit 111 may execute the following processes as partial functions of the control unit 101. The image processing unit 111 temporarily stores a digital image signal received from the image shooting unit 110 in a memory, not illustrated, and carries out image-quality adjusting processes for adjusting white balance, color, brightness, etc., based on set values given by the user as well as set values determined by characteristics of an image. Moreover, the image processing unit 111 also carries out a process for generating moving image data from image signals of a plurality of frames that have been subjected to the image-quality adjusting processes. In this case, the image processing unit 111 of the present exemplary embodiment may generate moving image data that is compression-coded by carrying out an intra-frame coding process on each of frames of the moving image data. Moreover, by utilizing a difference, motion prediction, etc., among a plurality of frames of moving image data, moving image data that is compression-coded may be generated. For example, by using any one of various known compression coding systems, such as Motion JPEG, MPEG, H.264 (MPEG4-Part10 AVC), etc., moving image data may be produced. In general, frame image data, intra-frame coded, is referred to as an I picture, image data, inter-frame coded by using a difference from the preceding frame, is referred to as a P picture, and image data, inter-frame coded by using a difference between the preceding frame and the succeeding frame, is referred to as a B picture. These compression methods are known methods, and since these are not related to characteristics of the present invention, a description thereof will be omitted.

The moving image data, processed in the image processing unit 111, is transmitted to the memory 104 by the control unit 101.

An audio input unit 120 collects voices (collects sound) on the periphery of the imaging apparatus 100 by using a built-in nondirectional microphone, an external microphone connected thereto through an audio input terminal, or the like, and converts an analog audio signal into a digital signal so that the resulting signal is transmitted to an audio processing unit 121.

The audio processing unit 121, which executes processes required for recording and reproducing sounds, is configured as a microcomputer in which programs that execute the following processes are installed. Moreover, the unit may execute the following processes as partial functions of the control unit 101. The audio processing unit 121 temporarily stores a digital audio signal transmitted from the audio input unit 120 in a memory, not illustrated, and carries out a level-adjusting process, a noise-reducing process and the like on the signal. Moreover, if necessary, it carries out a process for compressing an audio signal thereon. Then, the audio data thus processed by the audio processing unit 121 is stored in the memory 104 by the control unit 101.

Moreover, the display control unit 131, configured as a microcomputer for carrying out display-controlling processes for displaying an image on a display unit 130, reads a digital image signal temporarily stored in the image processing unit 111, and allows the display unit 130 to display the resulting image. The display unit 130 may be, for example, a liquid crystal panel, an organic electroluminescence (EL) panel, or the like, mounted on the imaging apparatus 100, or another display apparatus (for example, a television, a monitor, a projector, or the like) other than the imaging apparatus 100.

The memory 104 temporarily stores moving image data, audio data, etc., obtained by the image processing unit 111 and the audio processing unit 121.

The control unit 101 reads moving image data, audio data, etc., from the memory 104, and transfers these to a recording and reproduction unit 140, and the recording and reproduction unit 140 records the transferred moving image data and audio data on a recording medium 141. The recording and reproduction unit 140 records moving image data and audio data on the recording medium 141 as a moving image file. Additionally, the control unit 101 generates various data indicating camera settings at the time of capturing an image, detection data, etc., and may record these on the recording medium 141 together with the moving image data and audio data. In this case, the recording medium 141 may be a recording medium that is installed in the imaging apparatus, or may be a removable recording medium. Examples thereof include recording media of all types, such as a hard disk, an optical disc, a magneto-optical disc, a CD-R, a DVD-R, a magnetic tape, a nonvolatile semiconductor memory, a flash memory, etc.

Moreover, the recording and reproduction unit 140 reads (reproduces) the moving image file and the like recorded on the recording medium 141. The control unit 101 reads, for example, header information contained in the read-out moving image, and based on the header information, controls the recording and reproduction unit 140 so as to read moving image data and audio data to be reproduced from the recording medium 141. The recording and reproduction unit 140 transfers the moving image data thus read to the image processing unit 111, and also transfers the reproduced audio data to the audio processing unit 121. The image processing unit 111 successively stores each frame of the reproduced moving image data in a memory, not illustrated. Moreover, the display control unit 131 successively reads each frame stored in the memory, not illustrated, and displays the image on the display unit 130. On the other hand, the audio processing unit 121 decodes a digital audio signal from the reproduced audio signal, and converts it into an analog signal so that the analog audio signal is output to an audio output unit (speaker, earphone terminal, audio output terminal, etc.), not illustrated.

The imaging apparatus 100 according to the present exemplary embodiment has a normal moving image shooting mode (first mode) and a consecutive moving image shooting mode (second mode), as described earlier. In the normal moving image shooting mode (first mode), the apparatus records moving image data, captured from the start of a moving image shooting process of one time up to the completion thereof, on a recording medium as one file. Moreover, in the consecutive moving image shooting mode (second mode), an added moving image file, formed by adding new moving image data onto the existing moving image file, can be recorded on the recording medium.

The following description will discuss a file format of a moving image file to be recorded on the recording medium 141 by the imaging apparatus of the present exemplary embodiment. In the present exemplary embodiment, an MOV file format is used as a general format.

As illustrated in FIG. 2A, an MOV file recorded in the MOV file format is composed of "mdat atom" of steam data of moving image data, and "moov atom" corresponding to information relating to the stream data of the moving image data.

In the "mdat atom", there are a plurality of chunks cN as illustrated in FIG. 2B, and each chunk is composed of a plurality of samples sM as illustrated in FIG. 2D. Moreover, for example, as illustrated in FIG. 2E, each sample corresponds to each frame of moving image data coded as indicated by I0, B-2, B-1, P3, . . . , for each of the samples. In this case, I0, I1, I2, . . . , In represent frame image data (I picture) that is intra-coded (intra-frame coded). B0, B1, B2, . . . , Bn represent frame image data (B picture) that is coded (inter-frame coded) based on bidirectional reference. P0, P1, P2, . . . , Pn represent frame image data (P picture) that is coded (inter-frame coded) based on reference in one direction (forward direction). Although the present exemplary embodiment has exemplified a structure in which the inter-frame coding is used, all the data may be frame image data (I picture) that is intra-frame coded.

As illustrated in FIG. 2C, "moov atom" is composed of "mvhd atom" constituted by header information in which the date and time of formation, etc., are recorded and "trak atom" in which information relating to steam data of moving image data stored in "mdat atom". That is, "moov atom" is used for recording managing information of the moving image data. As pieces of information to be stored in "trak atom", "stco atom (referred to also as stco box)" for use in storing information of an offset value to each chunk of "mdat atom" as illustrated in FIG. 2H, "stsc atom (referred to also as stsc box)" for use in storing information of the number of samples in each chunk, as illustrated in FIG. 2G, and "stsz atom (referred to also as stsz box)" for use in storing information relating to the size of each sample, as illustrated in FIG. 2F, are proposed. Therefore, the quantity of data to be stored in the above-mentioned "stco atom", "stsc atom", and "stsz atom" is increased together with the quantity of recorded image data, that is, the recording period of time. For example, in a case where, for example, image data of 30 frames for one second is recorded as an MOV file so as to be stored in one chunk for every 15 frames, the quantity of data becomes 1 mega bytes in two hours, with the result that the moov atom having a capacity of 1 mega bytes is required. Upon recording by using the MOV file format, the moving image stream data increases with time, and since its size is very large, the moving image stream data need to be written in an external memory 407 as a file even during the recording process. However, since the moov atom also increases in its size according to the recording time as described earlier, the size of MOV header is unknown up to the completion of the recording, it is not possible to determine a writing offset position into the file of the moving image stream data. For this reason, in general, by utilizing the flexibility of the MOV file format, a moving image file is formed in which the "mdat atom" is disposed at the leading portion of a file, with the "moov atom" being disposed behind the "mdat atom" upon completion of the recording; thus, it is possible to properly address the above-mentioned issue.

However, during reproduction of the MOV file, the "moov atom" of the MOV file is read from a recording medium, and the "stco atom", "stsc atom", and "stsz atom" are analyzed from the "moov atom" so that an accessing process to each of the chunks inside the "mdat atom" can be carried out. For this reason, rather than disposing the "moov atom" behind the "mdat atom", disposing the "moov atom" at the leading portion of the "MOV file", as illustrated in FIG. 2A, is able to provide a faster access to the "mdat atom".

Therefore, in the imaging apparatus 100 according to the present exemplary embodiment, by carrying out a sequence of processes as illustrated in FIG. 3, a moving image file in which the "moov atom" is disposed at the leading portion of the "MOV file" as illustrated in FIG. 2A can be generated.

The file managing system of the recording medium 141 of the present exemplary embodiment is described on the premise that an FAT file system generally used in an assembled apparatus is applied. Since the technique of the FAT file system has been widely known, the description thereof is given only on operations by which the present exemplary embodiment is characterized. In this connection, for example, a flash memory or the like of the recording medium 141 manages physical memory areas inside the recording medium 141 by its built-in microcomputer. In response to an access from the recording and reproduction unit 140 of the imaging apparatus 100, the operations are carried out as if the data were logically stored by the FAT file system.

<Normal Moving Image Shooting Mode>

Referring to FIG. 3 and FIGS. 4A to 4C, the following description will discuss operations to generate a moving image file in which the "moov atom" is disposed at the leading portion of the "MOV file" as illustrated in FIG. 2A. FIG. 3 is a flow chart that illustrates operations of the imaging apparatus 100 in a case where a moving image shooting process is carried out in the normal moving image shooting mode (first mode) according to the present exemplary embodiment. These operations are basically controlled by the control unit 101 of the imaging apparatus 100. Moreover, FIGS. 4A to 4C illustrate states of data to be written in each of logical clusters of the recording medium 141 and an FAT (File Allocation Table), in a case where a moving image shooting process is carried out in the normal moving image shooting mode (first mode) according to the present exemplary embodiment.

First, in a state where the normal moving image shooting mode is selected by the operation unit 102 of the imaging apparatus 100, when an instruction for staring an image shooting process is input from the operation unit 102, the control unit 101 transmits the instruction for starting the image shooting process to the respective blocks of the imaging apparatus 100 so that a moving image shooting is started (YES in step S301).

Then, the imaging apparatus 110 acquires a digital image signal, and the image processing unit 111 performs predetermined image processing on the digital image signal so that moving image data is generated from image signals of a plurality of frames. The control unit 101 temporarily stores the moving image data generated by the image processing unit 111 in the memory 104. On the other hand, the audio input unit 120 acquires a digital audio signal, and the audio processing unit 121 performs predetermined processing on the digital audio signal so that audio data is generated. Moreover, the control unit 101 temporarily stores the audio data generated by the audio processing unit 121 in the memory 104. Furthermore, the control unit 101 transmits moving image data and audio data stored in the memory 104 to the recording and reproduction unit 140 as stream data (moving image data stream) at a predetermined timing. The recording and reproduction unit 140 writes the moving image data stream on the recording medium 141 (step S302). This moving image data stream corresponds to a portion of data that forms a mdat in the MOV file described by reference to FIGS.

2A to 2H, and the moving image data stream is successively added at a predetermined timing (step S305 to be described below).

Next, the control unit 101 newly forms a moov atom, and carries out a temporarily storing process in the memory 104. This moov atom corresponds a portion of data to be formed into a moov atom in the MOV file, as illustrated in FIGS. 2A to 2H, and includes a stco atom, stsc atom, stsz atom, and other required information in association with moving image stream data recorded in step S302 (step S303).

Moreover, the control unit 101 receives an instruction for completion of the image shooting input from the operation unit 102, and determines whether the sequence should proceed to an image shooting completion state (step S304). In a case where no instruction for completion of the image shooting is input thereto (NO in step S304), the control unit 102 controls the recording and reproduction unit 140 so as to further record a moving image data stream on the recording medium 141 (step S305). In step S305, the control unit 101 transmits moving image data and audio data to be successively stored in the memory 104 to the recording and reproduction unit 140 as steam data (moving image data stream) at a predetermined timing. The recording and reproduction unit 140 adds a new moving image data stream immediately after the moving image data stream that has been recorded in recording medium 141 in step S302 or the like.

Next, the control unit 101 updates a stco atom, stsc atom, stsz atom, and other required information in the moov atom on the memory 104, formed in step S303, so as to be associated with the moving image data stream further recorded in step S305 (step S306).

Thereafter, as long as the image shooting is not stopped, the control unit 101 performs control so that the processes from steps S304 to S306 are executed.

Next, upon receipt of an instruction for stopping the image shooting from the operation unit 102 (YES in step S304), the control unit 101 transmits all the moving image data and audio data left in the memory 104 to the recording and reproduction unit 140 as steam data (moving image data stream). The recording and reproduction unit 140 adds the last moving image data stream immediately after the moving image data stream that has been recorded in recording medium 141 in step S302, S305, or the like (step S307).

Next, the control unit 101 updates a stco atom, stsc atom, stsz atom, and other required information in the moov atom, formed in step S303, so as to be associated with the moving image data stream added to step S307 (step S308). These steps S302 to S308 are defined as an image shooting process S320.

The data that has been so far recorded on the recording medium 141 by the image shooting process at this time is moving image data streams. FIG. 4A illustrates states of the FAT and the data area of the recording medium 141 at this time. As illustrated in FIG. 4A, the moving image data stream is recorded by the image shooting process at this time in such a manner as to bridge areas between cluster numbers 1 and 2 within the data recording area. In this case, the FAT is set so as to read the area of cluster number 2 next to the area of cluster number 1 and also set so as to indicate a terminal of the file in the area of cluster number 2. That is, the FAT area corresponding to cluster number 1 has a set number of "2" and the FAT area corresponding to cluster number 2 has a set symbol of "FF".

Referring back to FIG. 3, the description will be further given. Upon completion of updating the moov atom, the control unit 101 determines whether the moov atom stored in the memory 104 has a quantity of data that is an integral multiple of the cluster size of the recording medium 141 (step S309). In the FAT file system, the recording medium 141 is capable of setting the size of one cluster as 32 kilobytes, 16 kilobytes, 8 kilobytes, etc. In step S309, the moov atom checks whether the quantity of data is an integral multiple of anyone of these sizes. That is, supposing that the size of one cluster is 32 kilobytes, it is determined whether the quantity of data corresponds to 64 kilobytes, 704 kilobytes, etc. Moreover, when the moov atom stored in the memory 104 is not an integral multiple of the cluster size of the recording medium 141 (NO in step S309), the control unit 101 adds, for example, blank data (free atom) behind the moov atom so as to have a capacity of an integral multiple of the cluster size. For example, supposing that the capacity of the moov atom is 17 kilobytes and that the cluster size is 32 kilobytes, a free atom corresponding to 15 kilobytes is generated, and stores it behind the moov atom of the memory 104. Thus, the size of the area (referred to as "moov data") formed by adding the moov atom and the free atom to each other is allowed to have an integral multiple of the cluster size (step S310).

Next, the control unit 101 transmits the moov atom or the moov data containing the moov atom stored in the memory 104 to the recording and reproduction unit 140, and performs control so as to record it on the recording medium 141 as a file (moov file). Additionally, the control unit 101 records the moov file, with the name of the file being set to, for example, MVI_0001.MOV, as a name of a moving image file (step S311).

Up to now, the data recorded on the recording medium 141 includes moving image data streams and moov files. FIG. 4B illustrates states of the FAT and the data area of the recording medium 141 at this time. As illustrated in FIG. 4B, a moov file is recorded in cluster number 3. Then, "FF" is set to the FAT so as to indicate that the area of cluster number 3 only has recorded data.

Lastly, the control unit 101 carries out processes in which the moving image data stream recorded on the recording medium is combined with the moov file so as to complete a moving image file. In the present exemplary embodiment, in order to combine the moving image data stream and the moov file, so far separately recorded, with each other, a process for rewriting only the FAT area is carried out. That is, the alternation is made so that the moov atom contained in the moov file is first read and the moving image data stream is next read (step S312). FIG. 4C illustrates this alternation state. In the present exemplary embodiment, a portion of FAT corresponding to cluster number 3 is altered from "FF" indicating the file terminal to "1" so as to read cluster number 1 next to cluster number 3.

With this arrangement, with respect to the moving image data, the data of cluster number 3 first appears so that, as illustrated in FIG. 2A, a moving image file in which the "moov atom" is disposed in the leading portion of the "MOV file" can be generated.

Upon completion of the processes from steps S301 to S312, the sequence again returns to a stand-by state, thereby completing the recording process. These processes from steps S309 to S312 are defined as a post-shooting process A S330. The imaging apparatus 100 according to the present exemplary embodiment carries out the processes from steps S301 to S312 in the normal moving image shooting mode so that a moving image file ("MOV file") is generated.

The description of the present exemplary embodiment has not referred to the directory entry; however, the leading cluster of the finally completed "MOV file" and the information indicating the file name MVI_0001.MOV are written in the directory entry. However, files (cluster numbers 1 and 2) of moving image data streams, generated in the middle of the way, need not be written in the directory entry. With respect to the "moov file" (cluster number 3), its file name and the information of the leading cluster are written in the directory entry so as to be recorded with the file name. In this case, in the present exemplary embodiment, the file name of "moov file" is the same as the file name of "MOV file" to be finally completed, and the leading cluster of the "MOV file" is the same as the leading cluster of the "moov file". Therefore, when the "MOV file" is generated, the file can be completed by rewriting only the FAT area.

Additionally, the file of the moving image data stream relating to the present exemplary embodiment is recorded on the recording medium 141 with the file name of "MVI_0001.DAT". Therefore, after the completion of the file, the information indicating "MVI_0001.DAT" written in the directory entry is deleted.

Moreover, the information of the moov atom recorded in the memory 104 may be successively copied in a nonvolatile memory, not illustrated. With this arrangement, even in a case where, upon moving-image shooting, the power supply is suddenly cut off, by using the moov atom information recorded in the nonvolatile memory during the reactivation of the imaging apparatus, the moving image file of the moving image data in the middle of the recording can be completed.

<Consecutive Moving Image Shooting Mode>

Referring to FIGS. 5A and 5B to FIG. 10, the following description will discuss operations of the imaging apparatus 100 in a case where the moving image shooting processes in the consecutive moving image shooting mode (second mode) according to the present exemplary embodiment are carried out.

Figure 9A:
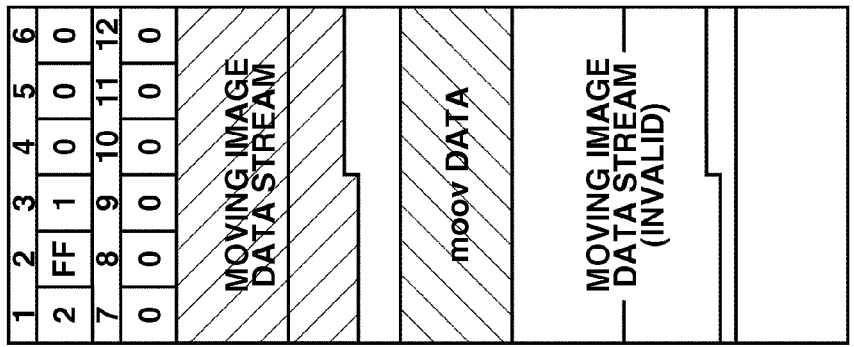
FIGS. 9A, 9B, and 9C are diagrams that illustrate a partial deletion of a moving image file on the recording medium.
Figure 9B:
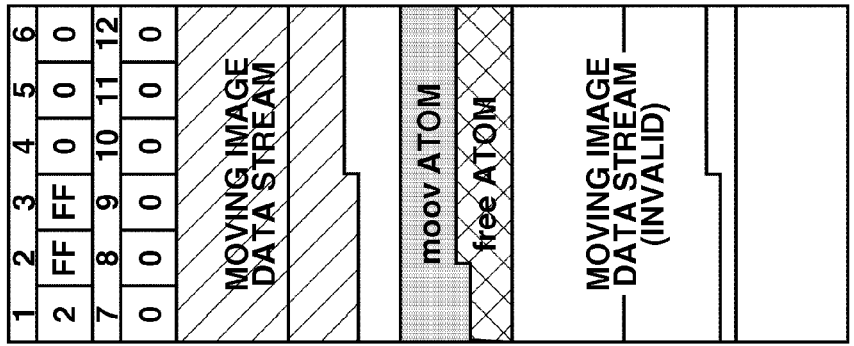
Figure 9C:
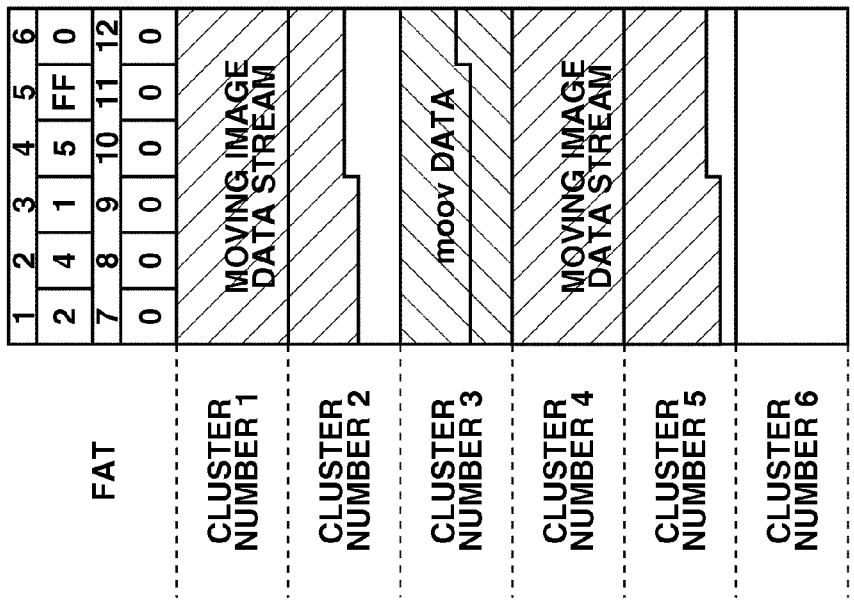

FIGS. 5A and 5B are flow charts that illustrate operations of the imaging apparatus 100 in a case where a moving image shooting process is carried out in the consecutive moving image shooting mode (second mode) according to the present exemplary embodiment. These operations are basically controlled by the control unit 101 of the imaging apparatus 100. Moreover, FIGS. 6A, 6B, and 6C, FIGS. 7A, 7B, and 7C, and FIGS. 8A, 8B, and 8C illustrate states of data to be written in each of logical clusters of the recording medium 141 and the FAT, in a case where a moving image shooting process is carried out in the consecutive moving image shooting mode (second mode) according to the present exemplary embodiment. In particular, FIGS. 6A, 6B, and 6C are diagrams that illustrate a generation of an added moving image file formed by adding newly captured moving image data (new moving image data) to a moving image file (existing moving image file) that has already been recorded on the recording medium 141. FIGS. 7A, 7B, and 7C are diagrams that illustrate confirmation screens after the moving image shooting. Moreover, FIGS. 8A, 8B, and 8C are diagrams that illustrate separation of new moving image data from the added moving image file, generation of a moving image file including only the moving image data (existing moving image data) of the existing moving image file, and generation of the new moving image file composed of only the new moving image data. Furthermore, FIGS. 9A, 9B, and 9C are diagrams that illustrate separation of new moving image data from the added moving image file, generation of a moving image file including only the moving image data (existing moving image data) of the existing moving image file, and deletion of the new moving image data.

The consecutive moving image shooting mode according to the present exemplary embodiment will be described on the premise that an image shooting period of time "image shooting time setting" is preliminarily set once. For example, the settable time lengths are 2 seconds, 4 seconds, 6 seconds, 8 seconds, etc.; however, these may be set as desired seconds. Moreover, the present invention is not intended to be limited only by the image shooting with a time length set as the image shooting time, and the shooting time may be extended by giving an instruction for prolonging the shooting time during the image shooting, or no shooting time may be set.

First, when the consecutive moving image shooting mode is selected by the operation unit 102 of the imaging apparatus 100, the control unit 101 determines whether new moving image data to be captured can be added to the existing moving image data recorded on the recording medium 141 (step S501). In this process, the determination as to whether it can be added is made depending on, for example, whether the recording medium 141 is attached, whether the existing moving image data file is protected, and whether the moving image record setting is identical to that of the existing moving image file. Moreover, determinations are preliminarily made as to whether the audio record setting of the moving image recording is identical to that of the existing moving image file, and as to whether the image shooting time setting in the current consecutive moving image shooting mode is identical to the image shooting time setting of the existing moving image file. For this reason, upon activation of the imaging apparatus 100, the control unit 101 preliminarily refers to a path of the moving image file recorded on the recording medium 141, and temporarily stores in a memory, not illustrated, the name of the moving image file lastly captured, among the moving image files captured in the consecutive moving image shooting mode. Moreover, the control unit 101 stores the results of data addition availability. The following description will summarize conditions in which the determination is not made as "addition available".

In the case of no file to be added:

To a moving image captured in the consecutive moving image shooting mode, a file name as "VSN_000X.MOV", an identifier referred to as "VSN", and a serial number of four digits are added. However, in a case where, upon activation of the imaging apparatus 100, no name of the moving image file lastly captured among moving image files captured in the consecutive moving image shooting mode is found, the determination is made as not "addition available".

In a case when there is a history of insertion/removal of the recording medium 141:

In a case where, upon activation of the imaging apparatus 100, there is a history of insertion/removal of the recording medium 141 after the last image shooting process in the consecutive moving image shooting mode, which is left in a nonvolatile memory, not illustrated, the control unit 101 determines this state as not "addition available". This arrangement is made to prevent the "VSN_000X.MOV" recorded on the recording medium 141 from being edited by a computer or the like to cause alternation of the image size, etc., thereby reducing the possibility of damaging the moving image file itself by a adding process. For this purpose, the moov data of "VSN_000X.MOV" to be subjected to an adding process is read, and the date and time information of the image shooting recorded in the moov atom and the time information of the insertion/removal left in the nonvolatile memory are compared with each other. The addition available moving image file VSN_000X.MOV" is designed so that the time information that was first captured among those of moving image data of a plurality of scenes recorded in the moving image is recorded in the moov atom.

In a case when the existing moving image file to be added is protected:

In a case where "VSN_000X.MOV" to be subjected to an adding process recorded on the recording medium 141 is protected, since it is highly possible that the user does not want the file to be revised, the determination is made as not "addition available".

In a case where the file size exceeds a predetermined size due to an adding image shooting process:

The recording medium 141 is managed by, for example, the FAT file system as described earlier. For example, in the case of FAT32, when the file size becomes 4 gigabyte (GB) or more per one file, the reading process is no longer available. Therefore, in a case where the "added moving image file" exceeds 4 GB due to the next image shooting, the determination is made as not "addition available".

In a case where the moving image reproducing time exceeds a predetermined period of time due to an adding image shooting process:

In the imaging apparatus, taking it into consideration that an image shooting process exceeding a predetermined period of time (for example, 30 minutes) is not desired, when a new image-shooting process in the consecutive image shooting mode causes the reproducing time of the moving image data of the "added moving image file" to exceed 30 minutes, the determination is made as not "addition available". For this purpose, for example, the reproducing time of the "added moving image file" described in the moov atom is read, and when it is 29 minutes 58 seconds, or the like, the determination is made as not "addition available".

In a case where the moving image record setting is not identical to that of the existing moving image file to be subjected to an adding process:

In a case where new moving image data is added to the existing moving image file as described in the present exemplary embodiment, if the frame rate, the image size, the GOP construction, or the moving image coding system is altered in the middle of a moving image, a seamless reproducing process might not be carried out. For this reason, in a case where the moving image record setting of new moving image data is not identical to that of the moving image data of the existing moving image file, the determination is made as not "addition available". The information of the frame rate, the image size, the GOP construction, the moving image coding system, etc., is recorded in the moov atom, file header, etc., of the existing moving image file.

In a case where the audio record setting is not identical to that of the existing moving image file to be subjected to an adding process:

In a case where new moving image data is added to the existing moving image file as described in the present exemplary embodiment, if the audio sampling rate, the audio coding system, or the like is altered in the middle of a moving image, a reproducing process might not be carried out. For this reason, in a case where the audio record setting of new moving image data is not identical to that of the moving image data of the existing moving image file, the determination is made as not "addition available". The information of the audio sampling rate, the audio coding system, etc., is recorded in the moov atom, file header, etc., of the existing moving image file.

In a case where "image shooting time setting" is not identical to that of the existing moving image file to be subjected to an adding process:

The imaging apparatus according to the present exemplary embodiment has a system in which moving image data captured in a fixed period of time, such as 2 seconds, 4 seconds, 6 seconds, 8 seconds, etc., is added as described above. For this reason, an added moving image file to which only moving image data of 4 seconds is added is generated, and with respect to the file, a fast-forwarding process and a rewinding process, each having 4 seconds, are carried out. Consequently, in a case where "image shooting time setting" is not identical to that of the existing moving image file to be subjected to an adding process, the determination is made as not "addition available". The information relating to the "image shooting time setting" is also described in the moov atom, the file header, etc.

These are conditions by which the determination is made as not "addition available".

When an instruction for starting an image shooting process is input from the operation unit 102 (YES in step S502), the control unit 101 transmits the instruction for starting the image shooting process to the respective blocks of the imaging apparatus so that a moving image shooting is started. Then, the process S320 in FIG. 3 is continued until an instruction for completion of the image shooting is given. In other words, the control unit 101 successively records moving image data streams on the recording medium 141, generates the moov atom corresponding to each of the moving image data streams, and stores the moov atom in the memory, and these processes are continued until the instruction for completion of the image shooting is given. When the instruction for completion of the image shooting is input thereto, the moving image data and audio data lastly captured are further recorded on the recording medium 141 as moving image data streams. Then, the moov atom corresponding to the moving image data stream stored in the memory 104 is updated.

When the image-shooting process S320 is completed, the control unit 101 next reads the result of the addition availability determination given in step S501 prior to the image shooting. In the case of addition available, the control unit 101 shifts the sequence of processes to step S510 (added in step S503). In contrast, in the case of not addition available, the control unit 101 shifts the sequence to the post image-shooting process AS330 as a new image-shooting process (newly written in step S503). Since the description of process S330 is the same as that given in FIG. 3, the overlapping description will be omitted. To a moving image file to be captured in the consecutive moving image shooting mode, a file name "VSN_000X.MOV" is given.

The following description will discuss the case of addition available (added in step S503). In the case of the addition available, as illustrated in FIG. 6B, the control unit 101 controls the recording and reproduction unit 140 so as to record a new moving image data steam in an empty cluster of the existing moving image file to be subjected to an adding process, where no "VSN_000X.MOV" is recorded. Although the present exemplary embodiment has exemplified a structure in which the steam is recorded in a data area of cluster number 4 of the recording medium 141, any cluster may be used as long as it is an empty area. At this time, as a file name of the new moving image data stream, "VSN_000X+1.DAT", formed by incrementing the serial number of 4 digits of the file name of the "existing moving image file", is used.

In the case of "addition available", the control unit 101 controls the recording and reproduction unit 140 so as to read the moov data of the existing moving image file to be subjected to an adding process from the recording medium 141 so that the moov atom of the existing moving image file is stored in the memory 104 (step S510). Then, the control unit 101 carries out a combining process (step S511) of the new moving image data stored in the memory 104 by the image-shooting process S320 at this time with the moov atom (step S511). As illustrated in FIGS. 2A to 2H, in the moov atom, the date and time of formation of a moving image, and the offset information to chunk indicating the frame of each moving image are stored. Thus, the control unit 101 generates a combined moov atom by using two moov atoms so as to make the chunk next to the last of the existing moving image data come to the first chunk of the new moving image data. More specifically, a process of, for example, adding an offset value of "stco atom" of the existing moving image data to the offset value of "stco atom" of the new moving image data is carried out. With this arrangement, a moov atom required for reproducing the moving image file formed by the existing moving image file to which the new moving image data is added can be generated. At this time, onto the newly generated moov atom, time at which the moving image shooting is carried out is recorded; however, to the moov atom of the added moving image, the information indicating the image-shooting time of the moving image data of the existing moving image file is recorded.

Next, the control unit 101 carries out the same processes as those of steps S309 and S310 of FIG. 3 so that moov data containing a moov atom is generated.

Moreover, the control unit 101 transmits the combined moov atom or moov data containing the combined moov atom stored in the memory 104 to the recording and reproduction unit 140, and controls the recording medium 141 to record the data as a file (moov file) (step S512). At this time, the control unit 101 controls the recording and reproduction unit 140 so as to overwrite the moov data on the existing moving image data file that has been already recorded on the recording medium 141. Moreover, the moov data of the existing moving image data may be deleted so that new moov data may be recorded in another cluster thereover.

Up to now, the data recorded on the recording medium 141 includes moving image data streams and moov files. FIG. 6B illustrates states of the FAT and the data area of the recording medium 141 at this time. In this connection, FIG. 6A illustrates the state of the data area of the existing moving image file already stored on the recording medium 141, and the state of the FAT area. In FIG. 6A, the existing moving image file "VSN_000X.MOV" is recorded in data areas from cluster numbers 1 to 3. Then, the FAT is set so as to read files in the order of cluster numbers 3>1>2.

In FIG. 6B, from the state illustrated in FIG. 6A, newly captured moving image data streams are first recorded in areas having cluster numbers of 4 and 5, and the FAT is set so as to read the area of cluster number 5 successively from the area of cluster number 4. As described earlier, as a file name of the new moving image data stream, "VSN_000X+1.DAT", formed by incrementing the serial number of 4 digits of the file name of the "existing moving image file", is used. Moreover, the area of the moov atom is allowed to use an area larger than that illustrated in FIG. 6A.

Next, the control unit 101 combines the stream of the existing moving image data recorded on the recording medium, the stream of the new moving image data, and the moov file with one another so that a moving image file completing process is carried out (step S513). In the present exemplary embodiment, in order to combine the file of the new moving image data stream newly recorded, with the existing moving image data of the existing moving image file, a process for rewriting only the FAT area is carried out. That is, the alternation is made so that next to the stream of the existing moving image data of the existing moving image file, the stream of the new moving image data can be read. FIG. 6C illustrates this alternation state. In the present exemplary embodiment, a portion of FAT corresponding to cluster number 2 is altered from "FF" indicating the file terminal to "4" so as to read cluster number 4, which is the first portion of the new moving image data stream, next to cluster number 2 indicating the terminal of the existing moving image data stream. Thus, the "addition available moving image file" is read in the order of 3>1>2>4>5 according to the FAT. In this case, in the same manner as in the "existing moving image file", a file name, "VSN_00X.MOV", is used as the "added moving image file".

With this arrangement, by rewriting the FAT after completing the recording of the new moving image data, the imaging apparatus 100 of the present exemplary embodiment is able to generate a moving image (added moving image file) having the existing moving image file added. By generating such an added moving image file, even in the case of an imaging apparatus incapable of generating moving image data of a plurality of files in a seamless manner, the moving image data of the existing moving image file and the moving image data obtained by a new image-shooting process can be reproduced seamlessly.

Upon forming these moving image files, the imaging apparatus 100 of the present exemplary embodiment records the first determined time information of "shooting time setting" as the moov atom and the moov data. That is, for example, by confirming the moov atom of the added moving image file, it is possible to detect, for example, the fact that the moving image file is formed by allowing moving image data of 4 seconds to be successively added. In the same manner, it is also possible to detect the fact that the moving image data has 2 seconds, 6 seconds, and 8 seconds.

Next, the control unit 101 displays the moving image data of the added moving image file recorded on the recording medium 141 on the display unit 130 (step S520). For this purpose, the control unit 101 controls the recording and reproduction unit 140 so as to read the added moving image file recorded on the recording medium 141 from the recording medium 141. The control unit 101 reads the moov atom or the like of the added moving image file thus read out. Moreover, by using an offset value at the time of combining the moov atoms in step S511, the control unit 101 specifies a chunk corresponding to the leading frame of new moving image data lastly captured, and allows the image processing unit 111 to decode the image signal in the corresponding frame. Then, the image processing unit 111 stores the image signal of the leading frame of the new moving image data thus decoded in a memory, not illustrated, and the control unit 101 controls the display control unit 131 so as to read the image signal from the memory so that the display control unit 131 displays the image on the display unit 130 (step S520).

FIG. 7A illustrates this confirmation screen. In this screen, the control unit 101 controls the display control unit 131 so as to display items of "play", "store", "new" and "delete" on the display unit 130 so that the user is allowed to carryout operations while looking at this screen. When the user selects "play" by operating the operation unit 102, the image of the added moving image files combined by the processes up to step S513 can be reproduced. When "play" is selected, the control unit 101 controls the display control unit 131 so as to form a display as illustrated in FIG. 7B on the display unit 130. In this screen, a reproduction of a portion corresponding to the new moving image data stream lastly captured among the "added moving image files" is started. For this purpose, the control unit 101 refers to the moov atom, specifies the offset of chunk of the frame image to be successively read, and controls the recording and reproduction unit 140 so as to read the corresponding chunk from the recording medium 141. In a case where "skip forward" or "skip backward"

displayed on the screen is selected, the control unit 101 allows the moving image data to skip forward or backward for a period of time corresponding to "the shooting time setting" recorded in the moov atom of the added moving image file. In other words, when "the shooting time setting" is 4 seconds, with the moving image data of the added moving file being composed of moving image data of 4 seconds, an arrangement is made so as to allow the moving image data to skip for every 4 seconds. Moreover, when "the shooting time setting" is 2 seconds, with the moving image data of the added moving file being composed of moving image data of 2 seconds, an arrangement is made so as to allow the moving image data to skip for every 2 seconds. For example, "the added moving image file" formed by connecting 5 scenes, each having 4 seconds, to one another is prepared, and when, during reproduction of a scene of two seconds of new moving image data lastly captured (a scene in the lapse of time of 18 seconds in the moving image as a whole), "skip forward" is operated, the following operations are carried out. That is, as illustrated in FIG. 7C, the control unit 101 allows "the added moving image file" being under reproduction to skip backward by 4 seconds, and the scene at the time of 14 seconds is displayed. FIG. 7C illustrates not the new moving image data lastly captured, but moving image data one time before the current data. In other words, not a shift to the leading frame of each scene, but a skip is made on a basis of seconds for each scene determined prior to the image shooting, on the moving image data of the added moving image file. The control unit 101 analyzes the moov atom, and specifies the recording position of the chunk of the frame image in the lapse of time of 14 seconds, thereby controlling the moving image to be reproduced from the corresponding position.

Referring back to FIG. 7A, the description is continued. When "store" is selected (store in step S530), the control unit 101 controls the display control unit 131 so as to delete the display illustrated in FIG. 7A, with "the added moving image file" recorded on the recording medium 141 in the processes up to step S513 being kept in the recorded state (step S540). Then, the control unit 101 controls the respective units of the imaging apparatus 100 to again return to the stand-by state.

Moreover, when "new" is selected ("new" in step S530), the control unit 101 carries out a separation process for dividing "the added moving image file" recorded on the recording medium 141 by the processes up to step S513 into two (step S550). For this purpose, by using the offset value at the time of combining the moov atoms loaded in the memory 104, the control unit 101 specifies the recording position of chunk corresponding to the leading frame of the new moving image data lastly captured (step S551). That is, in a state illustrated in FIG. 8A, the control unit 101 specifies the position (cluster numbers 4, 5) corresponding to the new moving image data stream of "the added moving image file" recorded on the recording medium 141.

Then, the control unit 101 controls the recording and reproduction unit 140 to rewrite the FAT area of the recording medium 141 so as to separate the data area corresponding to the new moving image data stream from "the added moving image file" (step S552). Then, the file name of the separated new moving image data stream is set as "VSN_000X+1.DAT". Referring to FIGS. 8A, 8B, and 8C, the following description will explain this state: "the added moving image file" recorded on the recording medium 141 is designed so as to read cluster number 4 corresponding to the new moving image data stream, next to cluster number 2, in a state as illustrated in FIG. 8A. In this case, by the process in step S552, a table corresponding to cluster number 2 in the FAT area is rewritten from "4" to "FF" so as to set cluster number 2 as the terminal of a file, as illustrated in FIG. 8B.

Moreover, the control unit 101 re-generates a moov atom corresponding to the existing moving image data stream originally recorded on the recording medium 141, and adjusts its size to form moov data, as illustrated in steps S309 and S310, and then records the moov data on the recording medium 141. After deleting the moov data of "the added moving image file", moov data containing the moov atom corresponding the again formed existing moving image data stream is recorded on the recording medium 141 (step S553). In the present exemplary embodiment, as illustrated in FIG. 8B, this moov data is recorded in data area of cluster number 3. A file name "VSN_000X.MOV" is used for the file of this moov data. With this arrangement, preparation is made so as to generate a moving image file virtually identical to "the existing moving image file" originally recorded on the recording medium 141.

Furthermore, the control unit 101 again generates a moov atom corresponding to the separated new moving image data, and adjusts the size of the regenerated moov atom to form moov data, as illustrated in steps S309 and S310, and then records this moov data in a new data area of the recording medium 141 (step S554). In the present exemplary embodiment, as illustrated in FIG. 8B, this moov data is recorded in data area of cluster number 6. A file name "VSN_000X+1.MOV" is used for the file name of this moov data. With this arrangement, preparation is made so as to generate a moving image file of "new moving image file".

FIG. 8B illustrates states of the recording medium 141. As illustrated in FIG. 8B, the existing moving image data stream is recorded in such a manner as to bridge areas between cluster numbers 1 and 2 within the data recording area. In this case, the FAT is set so as to read the cluster numbers in the order of cluster number 1>2, and is also set so as to indicate the terminal of the file in the area of cluster number 2. That is, the FAT area corresponding to cluster number 1 has a set number of "2" and the FAT area corresponding to cluster number 2 has a set symbol of "FF". Moreover, the new moving image data stream is recorded in such a manner as to bridge areas between cluster numbers 4 and 5 within the data recording area. In this case, the FAT is set so as to read the cluster numbers in the order of cluster number 4>5, and is also set so as to indicate the terminal of the file in the area of cluster number 5. That is, the FAT area corresponding to cluster number 4 has a set number of "5" and the FAT area corresponding to cluster number 5 has a set symbol of "FF". Moreover, a moov atom corresponding to the existing moving image data stream is recorded in the data area of cluster number 3, and a moov atom corresponding to the new moving image data stream is recorded in the data area of cluster number 6.

Next, processes for completing "the existing moving image file" and "the new moving image data file" are carried out (step S555 and step S556). For this purpose, the control unit 101 controls the recording and reproduction unit 140 in a manner as shown by steps S312 and S513 so that the FAT area of the recording medium 141 is rewritten. FIG. 8C illustrates this altered state. In the present exemplary embodiment, a portion of the FAT corresponding to cluster number 3 is altered from "FF" indicating the file terminal to "1" so as to read cluster number 1 next to cluster number 3. With this arrangement, "the existing moving image file" is read in the order of cluster number 3>1>2. Moreover, a portion of the FAT corresponding to cluster number 6 is altered from "FF" indicating the file terminal to "4" so as to read cluster number 4 next to cluster number 6. With this arrangement, "the new moving image file" is read in the order of cluster number 6>4>5.

In this manner, the control unit 101 reads the moov atom of the moving image file recorded on the recording medium 141, and alters this moov atom and newly forms a moving image file, and then again writes these on the recording medium 141 so that the data in the FAT area can be rewritten. Thus, from "the added moving image file" (VSN_000X.MOV), "the new moving image file" (VSN_000X+1.MOV) is generated so that a moving image file that is virtually identical to "the added moving image file" (VSN_000X.MOV) originally recorded on the recording medium 141 can be formed.

Moreover, when "delete" is selected (delete in step S530), the control unit 101 separates "the added moving image file" recorded in the processes up to step S513 into two, and carries out a process for deleting (nullifying) the new moving image data (step S560). For this purpose, first, the control unit 101 carries out processes indicated by steps S551 to S553.

Next, the control unit 101 carries out a process for deleting the file of the new moving image data stream (step S561). For this purpose, in order to nullify the moving image data stream corresponding to the separated new moving image data, the control unit 101 sets information indicating the fact that no file is recorded in the FAT corresponding to cluster numbers 4 and 5 of data areas of the recording medium 141. Thus, the file of the new moving image data stream is dealt as being deleted on the FAT.

FIG. 9B illustrates states of the recording medium 141. As illustrated in FIG. 9B, the existing moving image data stream is recorded in such a manner as to bridge areas between cluster numbers 1 and 2 within the data recording area. In this case, the FAT is set so as to read the area of cluster number 2 next to the area of cluster number 1, and is also set so as to indicate the terminal of the file in the area of cluster number 2. That is, the FAT area corresponding to cluster number 1 has a set number of "2" and the FAT area corresponding to cluster number 2 has a set symbol of "FF". Moreover, the new moving image data stream is recorded in such a manner as to bridge areas between cluster numbers 4 and 5 within the data recording area; however, this is nullified. For this reason, the FAT is set so as to indicate the fact that no data is recorded in the areas of cluster numbers 4 and 5. That is, in each of FAT areas corresponding to cluster numbers 4 and 5, "0" is set. Moreover, a moov atom corresponding to the existing moving image data stream is recorded in the data area of cluster number 3.

Next, a process of step S555 for completing "the existing moving image file" is carried out. FIG. 9C illustrates this state. In the present exemplary embodiment, a portion of the FAT corresponding to cluster number 3 is altered from "FF" indicating the terminal of a file to "1" so as to read cluster number 1 next to cluster number 3. With this arrangement, "the existing moving image file" is read in the order of cluster number 3>1>2.

In this manner, the control unit 101 reads the moov atom of the moving image file recorded on the recording medium 141, and alters this, and then again writes this on the recording medium 141 so that the data in the FAT area can be rewritten. Thus, from "the added moving image file" (VSN_000X.MOV), a moving image file that is virtually identical to "the existing moving image file" (VSN_000X.MOV) originally recorded on the recording medium 141 can be generated.

Upon completion of the processes from steps S550 to S556 as well as from steps S560 to S555, the control unit 101 shifts the sequence to step S540, and controls the display control unit 131 so as to delete the display illustrated in FIG. 7A (step S540). Then, the control unit 101 controls the respective units of the imaging apparatus 100 to again return to the stand-by state.

As described above, with the imaging apparatus according to the present exemplary embodiment, in the normal moving image shooting mode (first mode), moving image data captured from the start of a moving image shooting of one time to the completion thereof is recorded on a recording medium as one file. Moreover, in the consecutive moving image shooting mode (second mode), a moving image file (added moving image file), formed by adding moving image data that is newly captured (new moving image data) onto the moving image file that has already been recorded on a recording medium (existing moving image file), can be recorded on the recording medium. In particular, upon newly capturing a moving image in the consecutive moving image shooting mode, the imaging apparatus of the present exemplary embodiment displays the moving image after the image shooting on a display screen, and allows the user to confirm the image. The imaging apparatus of the present exemplary apparatus reproduces and displays the moving image data (existing moving image data) of the existing moving image file and the new moving image data in a seamless manner. Then, after the user has confirmed the consecutively reproduced moving image, the user is allowed to select one of processes, such as recording the added moving image file, recording the new moving image data as another file, and deleting the new moving image data.

With the imaging apparatus according to the present exemplary embodiment, even in the case of an imaging apparatus incapable of reproducing moving image data of a plurality of files in a seamless manner, immediately after capturing a new moving image, the existing moving image data and the new moving image data can be reproduced and displayed in a seamless manner. Then, according to the process selected by the user at this time, the added moving image file can be recorded, or the new moving image data can be recorded as another file, or the new moving image data can be deleted. Therefore, the imaging apparatus of the present exemplary embodiment is able to improve the use convenience for the user while avoiding high costs.

The following description will discuss a process (error handling process) that is used when, upon adding new moving image data onto "the existing moving image file" in the consecutive moving image shooting mode, an irregular error occurs disabling shooting an image in a period of one scene that has been set prior to the image shooting.

In this case, the period of one scene is an image-shooting period of time of one scene that has been set in the aforementioned "image shooting time setting", and this period may be set, for example, as 2, 4, 6, 8 seconds, etc.

In the consecutive moving image shooting mode, the imaging apparatus 100 of the present exemplary embodiment is able to reproduce and display an "added moving image file", formed by adding moving image data that is newly captured onto the moving image file, after an image shooting process (step S520 in FIG. 5A and FIGS. 7A to 7C). As described above, the moving image data is allowed to skip forward or backward by a period of time corresponding to the "shooting time setting" stored in a moov atom of "the added moving image file". In other words, in a case where "the shooting time setting" is 4 seconds and the moving image data of the added moving image file is composed of moving image data of 4 seconds, the moving image data is allowed to skip for every 4 seconds (for each preliminarily determined period of time).

In spite of these skips, in a case where a scene having a period of time other than "the shooting time setting" is contained in the middle, even if an attempt is made to confirm only the leading image of each scene by using skipping processes, an offset occurs. In such a case, inconvenient operations might be caused to the user.

Therefore, the imaging apparatus 100 of the present exemplary embodiment is able to carry out an image shooting process in which scenes having a length of time other than "the image shooting time setting" are not contained at least in the middle of one "added moving image file". In this case, the scenes are limited to those in the middle because, for example, with respect to the last scene in "the added moving image file" a scene having a length of time other than "the image shooting time setting" may be used. This is because in the case of immediately after the last image shooting, no issue is caused in confirming only the leading image of each of scenes by using skipping processes.

Moreover, the occurrence of an error mentioned here includes, for example, a state in which the lid of a housing portion of the recording medium 141 is opened in the middle of moving image shooting and a state in which an image-shooting stop switch is pressed in the middle thereof. The "error handling process" to be described here corresponds to a process that is carried out when an error occurs to cause the image shooting to stop during an image shooting process in step S320 illustrated in FIG. 3. FIGS. 10A, 10B, and 10C illustrate states of moving images generated by respective error handling processes, and each block corresponds to one scene of a moving image. In FIGS. 10A, 10B, and 10C, a gray block indicates a moving image captured during an irregular error.

With respect to "the error handling", since a plurality of processes are proposed, descriptions are given to the respective processes, and any of "the error handling processes" may be used.

"Error handling process A" in which adding process is executed.

In this case, in the same manner as in the processes from steps S502 to S513 in FIG. 5A, "an added moving image file" is formed by adding new moving image data in which its image shooting is stopped in the middle to "the existing moving image file". However, unlike those illustrated in FIG. 5A, no confirmation screen is displayed as illustrated in FIG. 7A. Therefore, as illustrated in FIG. 10A, "an added moving image file" (VSN_000X.MOV) is generated by adding new moving image data onto "the existing moving image file".

However, in the case of adding image data of a scene further captured later thereon, since, as described earlier, a scene having a length other than "the image shooting time setting" is contained in the middle, with the result that, even if an attempt is made to confirm only the leading image of each scene by using skipping processes, an offset is caused. Therefore, in error handling process A, with respect to moving image data to be next captured, the control unit 101 does not allow it to be added to (VSN_000X.MOV), and records it on the recording medium 141 as a new moving image file, in order to avoid such an issue.

"Error handling process B" in which separation process is executed.

In the same manner as in the processes from steps S502 to S320 in FIG. 5A, a process for recording new moving image data on the recording medium is carried out. However, without adding new moving image data in which its image shooting is stopped in the middle to "the existing moving image file", "new moving image data" is formed. That is, in a case where an image shooting process is stopped by an irregular error, the control unit 101 carries out a process S330 following process S320 in FIG. 3. Moreover, no confirmation screen as illustrated in FIG. 7A is displayed. Therefore, as illustrated in FIG. 10B, "the existing moving image file" (VSN_000X.MOV) and "the new moving image file" (VSN_000X+1.MOV) are recorded on the recording medium 141.

However, in the case of adding image data of a scene further captured later thereon, since, as described earlier, a scene having a length other than "the image shooting time setting" is contained in the middle, with the result that, even if an attempt is made to confirm only the leading image of each scene by using skipping processes, an offset is caused. Therefore, in error handling process B, with respect to moving image data to be next captured, the control unit 101 does not allow it to be added to (VSN_000X+1.MOV), and records it on the recording medium 141 as a new moving image file, in order to avoid such an issue.

In another method, moving image data to be next captured may be added to the original "existing moving image file" (VSN_000X.MOV).

In another method, in a case where a scene having a length other than "the image shooting time setting" may be contained in the leading portion, the moving image data to be next captured may be added to the moving image file (VSN_000X+1.MOV) formed in the present operation.

"Error handling process B" in which deleting process is executed.

In the same manner as in the processes from steps S502 to S320 in FIG. 5A, a process for recording new moving image data on the recording medium is carried out. However, without adding new moving image data in which its image shooting is stopped in the middle onto "the existing moving image file", new moving image data is deleted. That is, in a case where an image shooting process is stopped by an irregular error, the control unit 101 carries out a process that is the same as step S561 or the like following process S320 in FIG. 3, and by using information of the FAT area, a deleting process for deleting moving image data in a cluster area in which the new moving image data has been recorded is carried out.

Moreover, no confirmation screen as illustrated in FIG. 7A is displayed. Therefore, as illustrated in FIG. 10B, "the existing moving image file" (VSN_000X.MOV) is left on the recording medium 141, with no file relating to new moving image data being recorded therein.

In this case, even if image data of a scene further captured later is added onto "the existing moving image file" (VSN_000X.MOV), no scene having a length other than "the image shooting time setting" is contained in the middle. Therefore, the image data of a scene to be next captured is added to "the existing moving image file" (VSN_000X.MOV).

In another method, the control unit 101 may record moving image data to be next captured on the recording medium 141 as a new moving image file (VSN_00X+1.MOV).

These are descriptions of "the error handling processes".

Moreover, in a case where moving image data to be next captured is recorded as a new moving image file, due to the "error handling processes", in the process in step S501 in FIG. 5A, a flag indicating an addition unavailable state is recorded on the header of a moov atom of the moving image data in the process of step S501 in FIG. 5A.

As described above, in a case where scenes, each having a predetermined period of time, are repeatedly captured in the consecutive moving image shooting mode, and successively added, if an image shooting process for a period of one scene determined prior to the image shooting is not performed due to an irregular error, an error handling process is carried out. By using the error handling process, it is possible to prevent a scene having a length less than a predetermined period of time from being contained in the middle of "the added moving image file" composed of a plurality of scenes. That is, a scene having a length less than the predetermined period of time is prevented from being contained in "the added moving image file". Alternatively, even when a scene having a length less than the predetermined period of time is contained, the corresponding scene is set to the leading scene or the last scene.

According to the error handling process, upon skip searching the "the added moving image file" composed of a plurality of scenes, each having a predetermined period of time, for every predetermined time, the user is allowed to carry out the skipping operations without causing much inconvenience to the user.

The present exemplary embodiments have given descriptions about an imaging apparatus. As the imaging apparatus, examples thereof include general compact digital cameras, digital single-lens reflex cameras, video cameras, portable telephones, etc. Moreover, with respect to apparatuses to which the technique of the present invention is applicable, not limited to imaging apparatuses, for example, a personal computer with a camera connected thereto may be proposed.

The above-mentioned exemplary embodiments may be realized on a software basis by using computers (or, a CPU, MPU, etc.) of a system or an apparatus. Therefore, computer programs themselves to be supplied to the computer so as to allow the computer to realize the above-mentioned exemplary embodiments are also means for realizing the present invention. That is, the computer programs themselves for use in realizing functions of the above-mentioned exemplary embodiments are portions of the present invention.

Additionally, the computer program for use in realizing the above-mentioned exemplary embodiments may be prepared as any mode as long as it can be read by a computer. For example, a program to be executed by object codes and interpreters, or script data, etc., to be supplied to an operating system (OS) may be proposed, but not limited thereto. The computer program for use in realizing the above-mentioned exemplary embodiments is supplied to a computer by a storage medium or a wired or wireless communication. Examples of the storage medium include magnetic storage media, such as a flexible disk, a hard disk, and a magnetic tape, optical/optical magnetic storage media, such as MOs, CDs and DVDs, and non-volatile semiconductor memories.

As the method for supplying a computer program by the use of wired or wireless communication, a method for using a server on the computer network is proposed. In this case, data files (program files) capable of configuring computer programs for forming the present invention are stored in the server. As the program file, those of an executable form or a source coding form may be used. Thus, by accessing to the server to download program files to a client computer, the client is supplied with the programs. In this case, the program file may be divided into a plurality of segment files, and the segment files may be dispersed and placed to different servers. In other words, the server apparatus for supplying the program files to a client computer so as to achieve the above-mentioned exemplary embodiments is also one portion of the present invention.

Moreover, by distributing a storage medium in which the computer programs for use in realizing the above-mentioned exemplary embodiments are stored in a coded state, users who satisfy predetermined conditions may be supplied with key information for decoding the code so that a computer possessed by the user may be allowed to install the programs. The key information may be supplied by allowing the user to download from a home page, for example, via the Internet.

Moreover, the computer program for use in realizing the above-mentioned exemplary embodiments may utilize OS functions that have already been operated on a computer. Furthermore, the computer program for use in realizing the above-mentioned exemplary embodiments may be partially configured by firmware such as an expansion board or the like to be installed into the computer, or may be executed by a CPU included in the expansion board or the like.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-011205 filed Jan. 21, 2011, which is hereby incorporated by reference herein in its entirety.

What is claimed is:

1. A recording method comprising:

receiving from a user a recording instruction for instructing to record moving image data;

setting a recording length of time for a single recording instruction;

recording moving image data for the recording length of time set in the setting on a recording medium in accordance with the recording instruction received from the user;

adding the moving image data recorded in accordance with the recording instruction to a predetermined moving image file which has been recorded on the recording medium so that the predetermined moving image file has a plurality of pieces of moving image data each of which is recorded in accordance with the single recording instruction; and performing a control, in a case where the recording length of time for the single recording instruction of the moving image data included in the predetermined moving image file is different from the recording length of time set in the setting, so as not to add the moving image data recorded in accordance with the recording instruction to the predetermined moving image file.

2. A recording apparatus comprising:

an instruction receiving unit that receives from a user a recording instruction for instructing to record moving image data;

a setting unit that sets a recording length of time for a single recording instruction;

a recorder that records moving image data for the recording length of time set by the setting unit on a recording medium in accordance with the recording instruction received by the instruction receiving unit, wherein the recorder adds the moving image data recorded in accordance with the recording instruction to a predetermined moving image file which has been recorded on the recording medium so that the predetermined moving image file has a plurality of pieces of moving image data each of which is recorded in accordance with the single recording instruction; and a controller that controls the recorder, wherein, in a case where the recording length of time for the single recording instruction of the moving image data included in the predetermined moving image file is different from the recording length of time set by the setting unit, the controller controls the recorder so as not to add the moving image data recorded in accordance with the recording instruction to the predetermined moving image file.

3. The recording apparatus according to claim 2, wherein the recorder adds information indicating the recording length of time set by the setting unit to the predetermined moving image file, and wherein the controller detects the recording length of time for the single recording instruction of the moving image data included in the predetermined moving image file based on the information added to the predetermined moving image file.

4. The recording apparatus according to claim 2, wherein in a case where the recording length of time for the single recording instruction of the moving image data included in the predetermined moving image file is different from the recording length of time set by the setting unit, the controller controls the recorder so as to record the moving image data recorded in accordance with the single recording instruction as a moving image file different from the predetermined moving image file.

5. The recording apparatus according to claim 2, wherein the predetermined moving image file has been recorded on the recording medium before the instruction receiving unit receives the recording instruction from the user.

* * * * *